United States Patent
Lewis et al.

(10) Patent No.: US 10,222,939 B1
(45) Date of Patent: Mar. 5, 2019

(54) METHOD FOR MANAGING COLLABORATIVE PLAYLISTS

(71) Applicant: Google Inc., Mountain View, CA (US)

(72) Inventors: Justin Lewis, Marina del Rey, CA (US); Gavin James, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 338 days.

(21) Appl. No.: 14/666,806

(22) Filed: Mar. 24, 2015

Related U.S. Application Data

(60) Provisional application No. 61/972,717, filed on Mar. 31, 2014.

(51) Int. Cl.
*G06F 3/048* (2013.01)
*G06F 3/0482* (2013.01)
*H04L 12/18* (2006.01)

(52) U.S. Cl.
CPC ........ *G06F 3/0482* (2013.01); *H04L 12/1822* (2013.01)

(58) Field of Classification Search
CPC .. G06F 3/04847; G06Q 10/10; H04L 12/1822
See application file for complete search history.

(56) References Cited

U.S. PATENT DOCUMENTS

| | | | |
|---|---|---|---|
| 2011/0314388 A1* | 12/2011 | Wheatley | G11B 27/034 715/751 |
| 2013/0031487 A1* | 1/2013 | Olsen | G06Q 50/01 715/751 |
| 2013/0191454 A1* | 7/2013 | Oliver | G06Q 10/10 709/204 |
| 2015/0317073 A1* | 11/2015 | Hull | G06F 3/04847 715/753 |

* cited by examiner

Primary Examiner — Haoshian Shih
(74) Attorney, Agent, or Firm — Lowenstein Sandler LLP

(57) ABSTRACT

A method for managing collaborative playlists is disclosed. The method includes providing, by a processing device, indication regarding one or more available collaborative guidance controls, receiving, by the processing device, first user specification that one or more of the collaborative guidance controls be set for a playlist, receiving, at the processing device, second user suggestion for addition to the playlist of one or more content items, and checking, at the processing device, the one or more content items for compliance with the first-user-specified collaborative guidance controls.

25 Claims, 8 Drawing Sheets

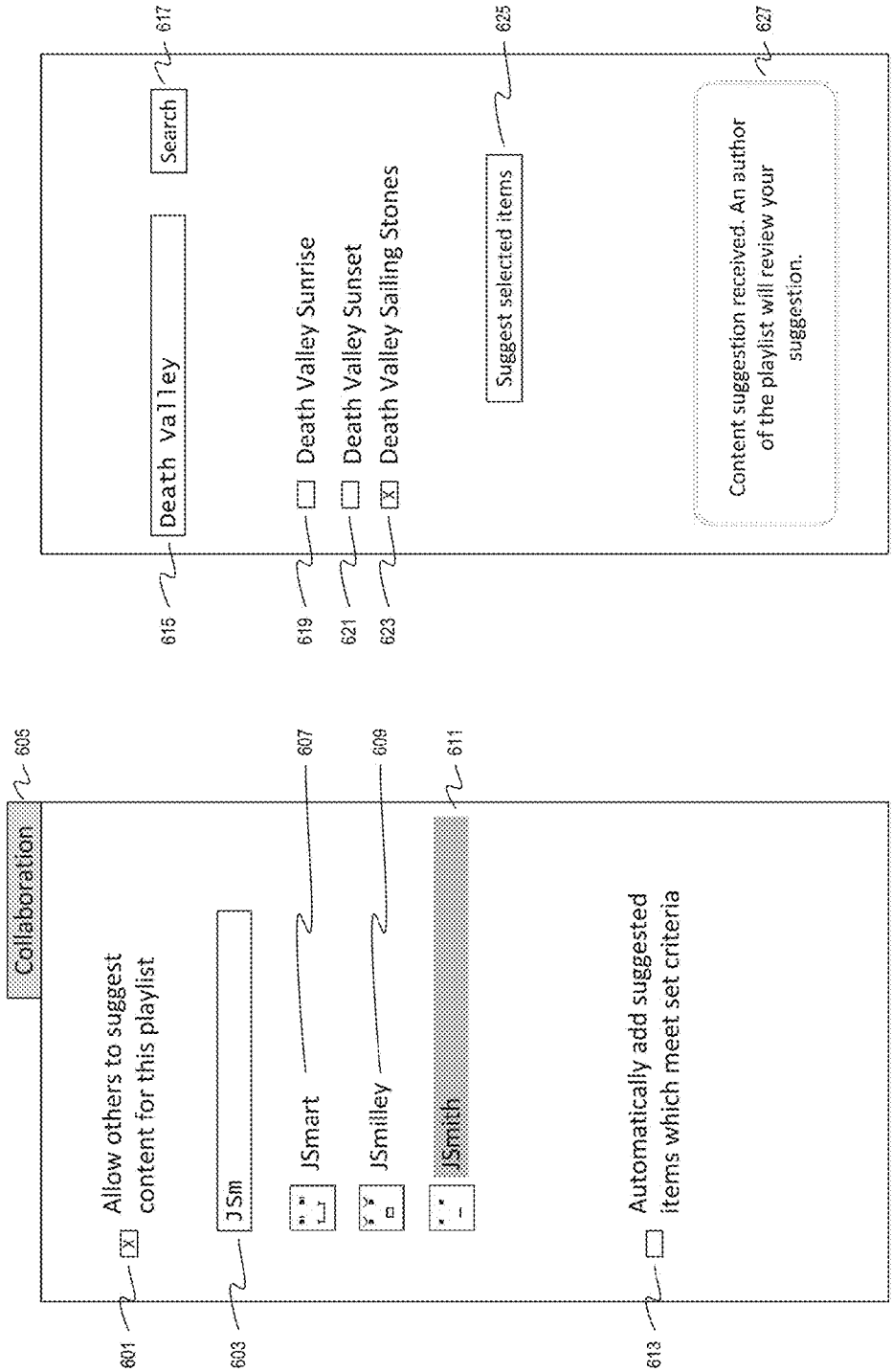

629 — The following four content items which meet your specification have been suggested. Please tick the boxes of those -- if any -- which should be added to the playlist. When done, click "OK." Or, if appropriate, click "Add all" or "Reject all."

631 ☐ California Condor Soars at NPS Pinnacles
633 ☒ Death Valley Sailing Stones
635 ☒ Joshua Tree Visitor Center

637 OK

639 Add All    641 Reject All

FIG. 6C

METHOD FOR MANAGING COLLABORATIVE PLAYLISTS

CROSS-REFERENCE TO RELATED APPLICATIONS

This application claims the benefit of U.S. Provisional Application No. 61/972,717, entitled, "METHOD FOR MANAGING COLLABORATIVE PLAYLISTS," filed Mar. 31, 2014, the entire content of which are incorporated herein by reference.

TECHNICAL FIELD

This disclosure relates to the field of content sharing platforms and, in particular, to managing collaborative playlists.

BACKGROUND

On the Internet, social networks allow users to connect to and share information with each other. Many social networks include a content sharing aspect that allows users to upload, view, and share content, such as video content, image content, audio content, and so on. Other users of the social network may interact with the provided content. The shared content may include content from professional content creators, e.g., movie clips, TV clips, and music videos, as well as content from amateur content creators, e.g., video blogging and short original videos.

Content sharing platforms allow a user to create playlists of the content maintained by the content sharing platform. The playlist feature of the content sharing platform allows a user to group his favorite content items together in a single location for playback. However, a playlist is typically the work of a single user. Playlist functionality typically does not allow for users other than that single user to participate in the formulation of the playlist.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation a method for managing collaborative playlists is disclosed. The method includes providing, by a processing device, indication regarding one or more available collaborative guidance controls. The method further includes receiving, by the processing device, first user specification that one or more of the collaborative guidance controls be set for a playlist. The method further includes receiving, at the processing device, second user suggestion for addition to the playlist of one or more content items. The method also includes checking, at the processing device, the one or more content items for compliance with the first-user-specified collaborative guidance controls.

In some implementations, the method also includes receiving, by the processing device, first user indication regarding one or more authors for the playlist. In some implementations the method further includes the available collaborative guidance controls comprising one or more of a collaborative guidance control specifying that suggested content items be uploaded by a specified user, a collaborative guidance control specifying that suggested content items regard an indicated topic, a collaborative guidance control specifying that suggested content items employ an indicated song, or a collaborative guidance control specifying that suggested content items feature an indicated user.

Furthermore the method, in some embodiments, also includes checking for compliance with the first-user-specified collaborative guidance controls comprising considering metadata of the one or more content items. The method, in some embodiments also includes receiving, at the processing device, first user indication that suggested content items matching the first-user-specified collaborative guidance controls be automatically added to the playlist, or that suggested content items matching the first-user-specified collaborative guidance controls be subjected to playlist author review.

Still further, the method, in some implementations, also includes receiving, at the processing device, first user indication that multiple content item instances are not permitted in the playlist. Additionally, the method, in some implementations, also includes receiving, at the processing device, first user indication regarding feed placement of content items which are added to the playlist via content item suggestion.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

FIGS. 6A, 6B, and 6C illustrate user interfaces (UIs) regarding collaborative guidance control functionality, according to an example.

DETAILED DESCRIPTION

Figure 1:
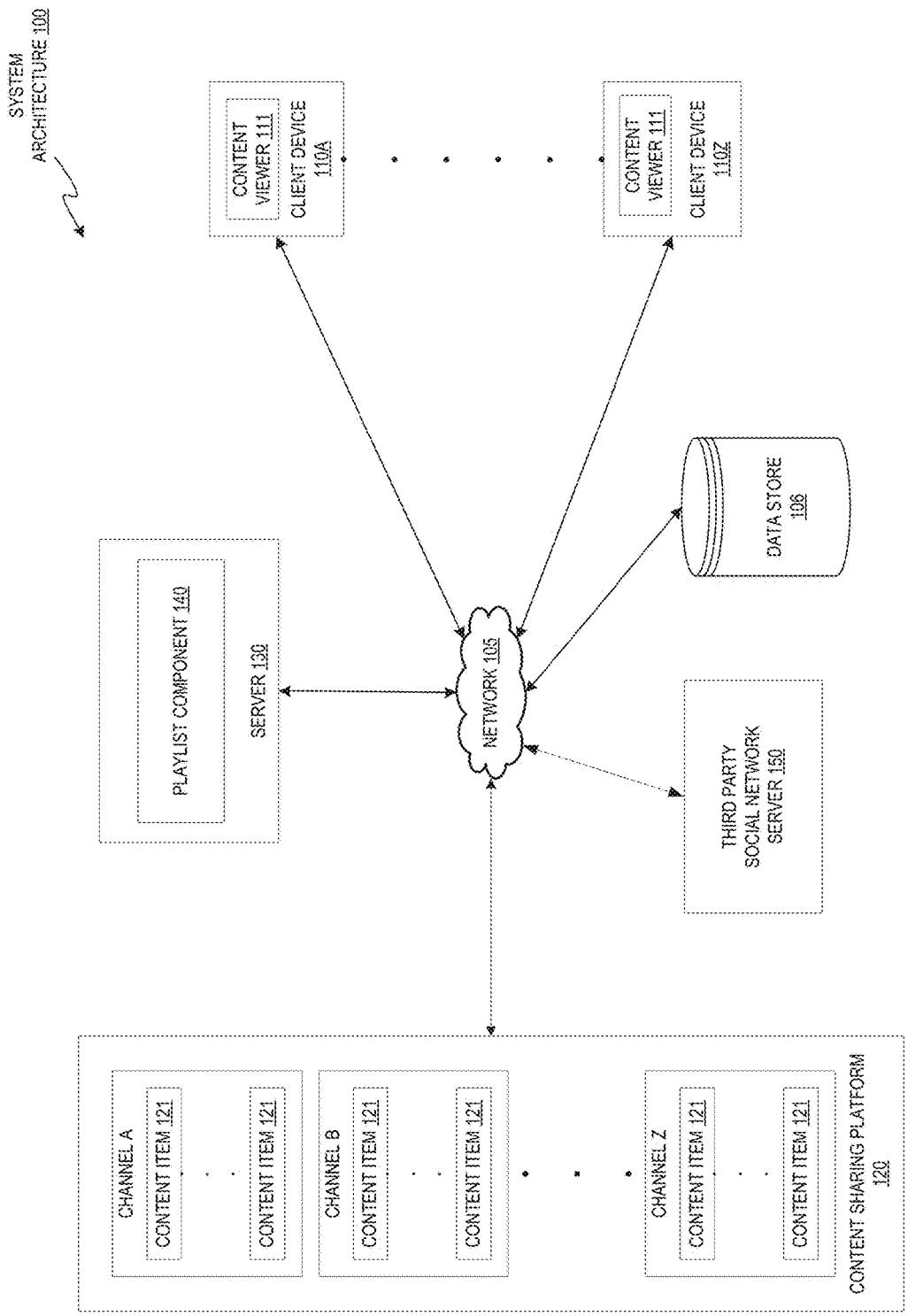
FIG. 1 illustrates a system architecture for implementing playlist functionality including collaborative guidance control functionality.

A playlist may be a list and/or an order of different content items that can be viewed in sequential or shuffled order without interaction from the user. A media viewer (e.g., a media viewer application and/or a web browser) may play the content items on a playlist in the order in which the content items are listed on the playlist. A user may also transition between content items on a playlist. For example, a user may wait for the next content item on the playlist to play or may select a particular content item in the playlist.

Playlists allow for the grouping together of content items. Such grouping together provides benefits including facilitating the organization of content items into sensible groupings (e.g., groupings by artist, composer, genre, era, topic, or mood), facilitating users making each other aware of content items (e.g., through users creating playlists and then sharing those playlists with other users).

A playlist is typically the work of a single user who creates the playlist and adds content items to the playlist. Playlist functionality typically does not allow for users other than that single user—say the user population of a content sharing platform—to participate in the formulation of the playlist. Were it the case that such users were able to, say, add content items to the playlist, the playlist would likely become filled with misguided additions, some from well-meaning but ill-informed users, others from spammers and other users looking to coopt the playlist for their own purposes. The single user would find himself or herself with the unenviable task of needing to sift through the playlist and prune away the misguided additions.

As such, even if the single user were able to open up his or her playlist to additions from others, the user would likely be unwilling to do so despite the potential richness which the user's playlist could gain due to the inputs of others.

Set forth herein are examples of approaches by which a user may be able to open a playlist to content item suggestions made by others while holding creative reins of the playlist. According to an example, such a user may in connection with a new or existing playlist be able to set collaborative guidance controls with which content item suggestions would be called for to comply. For instance, such a user might set a collaborative guidance control specifying that suggested content items have been provided (e.g., uploaded) by a specified user, might set a collaborative guidance control specifying that suggested content items regard an indicated topic, might set a collaborative guidance control specifying that suggested content items employ an indicated song, and/or might set a collaborative guidance control specifying that suggested content items feature an indicated user. Such a user so opening a playlist may be able to indicate that suggested content items that meet the set of one or more collaborative guidance controls be automatically added to the playlist, or might be able to opt review such collaborative guidance control-compliant suggested content items and decide whether or not one or more of them should be added to the playlist.

FIG. 1 illustrates an example system architecture 100 for implementing playlist functionality including collaborative guidance control functionality. The system architecture 100 includes client devices 110A through 110Z, a network 105, a data store 106, a content sharing platform 120, and a server 130. According to an example, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. According to an example, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a content viewer 111. In one implementation, the content viewers 111 may be applications that allow users to view content, such as images, videos, web pages, documents, etc. For example, the content viewer 111 may be a web browser that can access, retrieve, present, and/or navigate content (e.g., web pages such as Hyper Text Markup Language (HTML) pages, digital media items, etc.) served by a web server. The content viewer 111 may render, display, and/or present the content (e.g., a web page, a content viewer) to a user. The content viewer 111 may also display an embedded media player (e.g., a Flash® player or an HTML5 player) that is embedded in a web page (e.g., a web page that may provide information about a product sold by an online merchant). In another example, the content viewer 111 may be a stand-alone application that allows users to view digital content items (e.g., digital videos, digital images, electronic books, etc.).

The content viewers 111 may be provided to the client devices 110A through 110Z by the server 130 and/or content sharing platform 120. For example, the content viewers 111 may be embedded media players that are embedded in web pages provided by the content sharing platform 120. In another example, the content viewers 111 may be applications (e.g., mobile apps) that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

According to an example, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to content items and/or provide the content items to the user. For example, the content sharing platform 120 may allow a user to consume, upload, search for, approve of ("like"), dislike, and/or comment on content items. The content sharing platform 120 may also include a website (e.g., a webpage) that may be used to provide a user with access to the content items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel may include one or more content items 121. Examples of a content item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, content item 121 may also referred to as a media item.

A content item 121 may be consumed via the Internet and/or via a mobile device application. As used herein, "media," "content item," "online content item," "digital media," "digital content item," "media," and "media item" can include an electronic file that can be executed or loaded using software, firmware or hardware configured to present the digital content item to an entity. In one implementation, the content sharing platform 120 may store the content items 121 using the data store 106.

According to an example, server 130 may be one or more computing devices (e.g., a rackmount server, a server computer, etc.). Server 130 may, according to an example, be included in the content sharing platform 120. The server 130 may include a playlist component 140. Playlist component 140 may, according to an example, interact with content sharing platform 120 and/or with other third party social network servers 150. Examples of playlist component 140 are discussed in more detail below in conjunction with FIG. 2.

Although various examples set forth herein are discussed in terms of content sharing platforms and/or promoting social network sharing of a content item on the content sharing platform, that which is set forth herein may also be applied, for instance, to any type of social network providing connections between users. Moreover, that which is set forth herein is not limited to content sharing platforms that provide channel subscriptions to users.

In situations in which the systems discussed herein collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
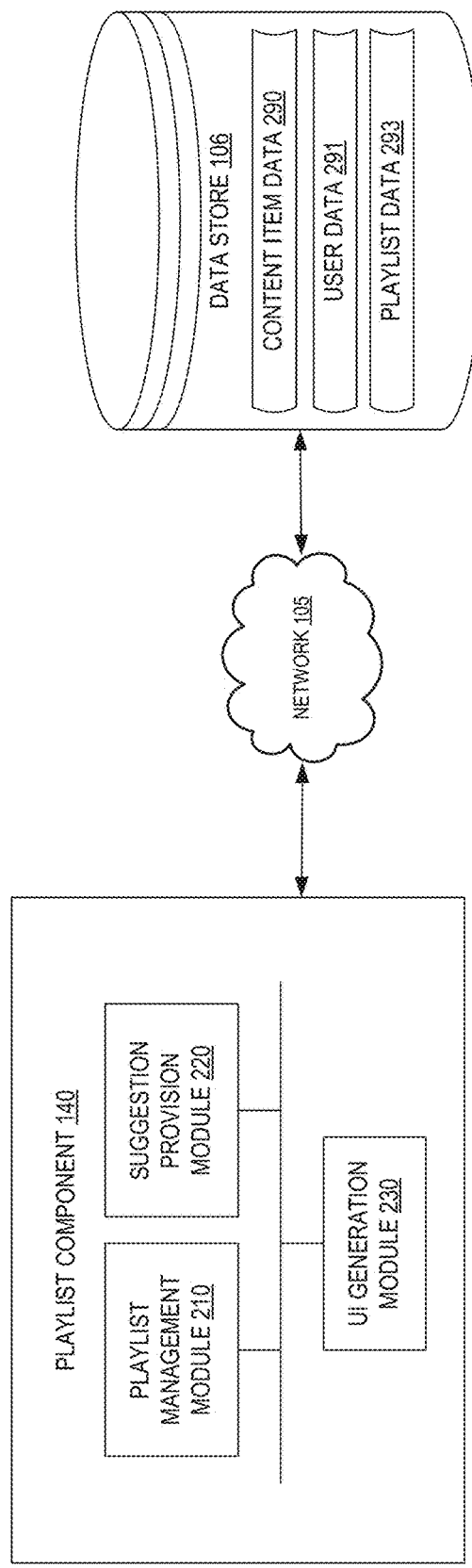
FIG. 2 is a block diagram illustrating a playlist component, according to an example.

FIG. 2 is an example block diagram illustrating playlist component 140, network 105, and data store 106. In accordance with an example, playlist component 140 includes playlist management module 210, suggestion provision module 220, and user interface (UI) generation module 230. A greater or fewer quantity of components may be included in playlist component 140. For example, two of the modules may be combined into a single module, or one of the modules may be divided into two or more modules. One or more of the modules may, according to an example, reside on different computing devices (e.g., different server computers).

The playlist component 140 is communicatively coupled to the data store 106. For example, these components may be coupled to the data store 106 via a network (e.g., via network 105). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data (e.g., metadata) 290, user data 291 (e.g., information regarding user groups and information regarding individual users), and playlist data 293 (e.g., indication of playlist titles, indication of playlist descriptions, indication of playlist-included content items, indication of set collaborative guidance controls, and playlist author indications).

Turning to playlist component 140, playlist management module 210 may perform operations including receiving playlist management selections, and receiving acceptances and/or rejections of content item suggestions. Suggestion provision module 220 may perform operations including receiving content item suggestions for playlist addition. UI generation module 230 may perform operations including implementing UI on behalf of playlist management module 210 and implementing UI on behalf of suggestion provision module 220. The functionality of playlist component 140 is discussed in greater detail herein.

Figure 3:
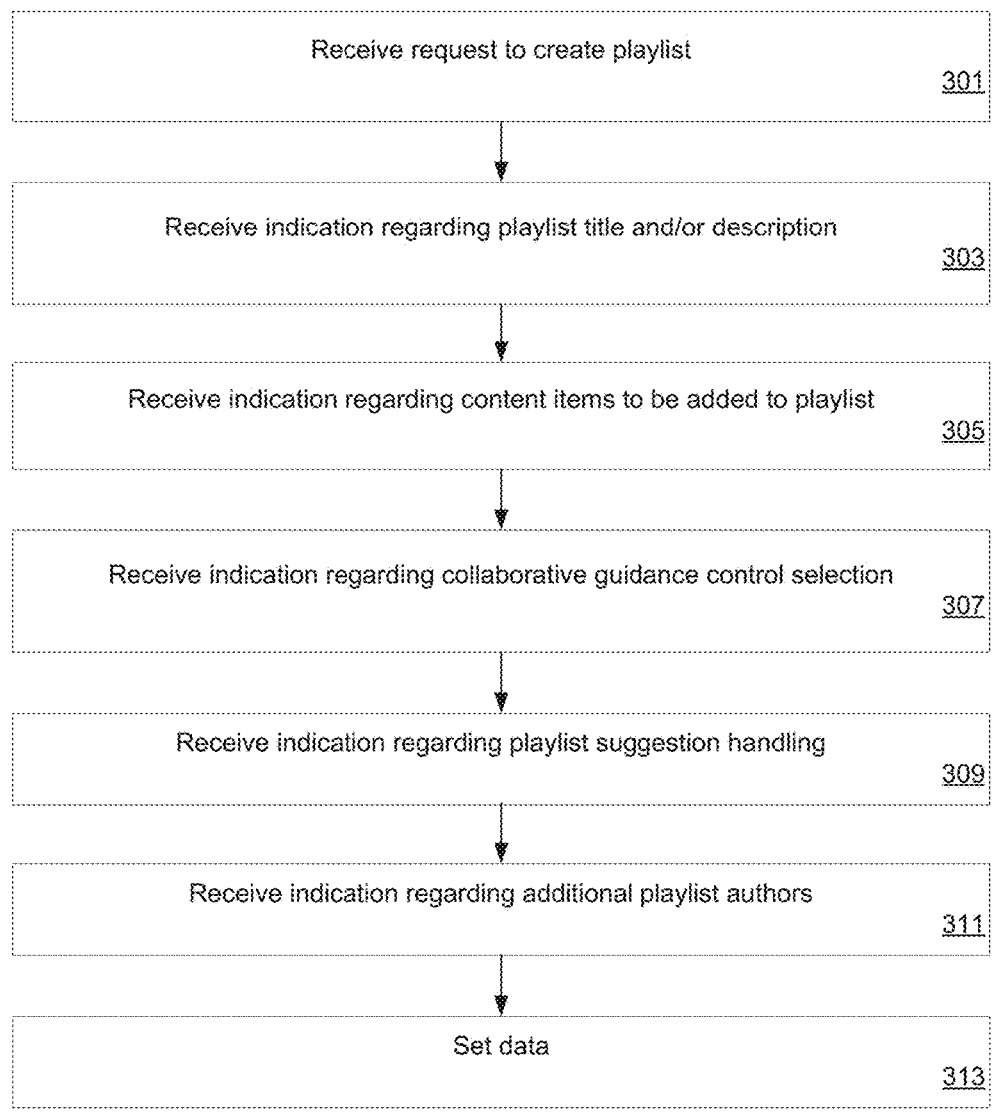
FIG. 3 is a flow diagram illustrating a method of receiving management selections regarding a new playlist, according to an example.

FIG. 3 illustrates a flow diagram of one example of a method of receiving management selections regarding a new playlist. The method may be performed by processing logic that comprises hardware (e.g., circuitry, dedicated logic, programmable logic, microcode, etc.), software (e.g., instructions run on a processing device to perform hardware simulation or instructions run on a processing device without the performance of hardware simulation), or a combination thereof. As one example, the method may be performed by a playlist component running on a computing device (e.g., playlist component 140 running on server 130). User interface (UI) functionality discussed hereinbelow in connection with FIG. 3 may regard a UI generated by playlist UI generation module 230 and displayed by content viewer 111 running on one of client devices 110A-110Z.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 3, at block 301 the processing logic may receive a request to create a playlist. The request may correspond to a user activating a button or link UI element. The button or link UI element may be labeled, say, "new playlist." The user, having requested the creation of the playlist, may be considered to be an author of the playlist. A playlist author may be authorized by the processing logic to perform playlist management operations including selecting collaborative guidance controls for the playlist, adding content items to the playlist, removing content items from the playlist, setting a playlist title, setting a playlist description, selecting additional authors for the playlist, approving suggestions for content items to be added to the playlist, and disapproving suggestions for content items to be added to the playlist.

At block 303, the processing logic may receive indication regarding a title for the playlist and/or indication regarding a description for the playlist. The indication may correspond to a title UI field element and/or a description UI field element. Where the user opts to specify a title for the playlist the user may specify the title via the title element (e.g., the user may specify the title "western national park videos"). Where the user opts to not specify a title for the playlist the user might specify no title via the title element (e.g., the user may leave the field element blank). Where the user opts to specify a description for the playlist the user may specify the description via the description element (e.g., the user may specify the description ("Let's collect the best videos of west-of-the-Rockies national parks!"). Where the user opts to not specify a description for the playlist the user might specify no description via the description element (e.g., the user may leave the field element blank).

At block 305 the processing logic may receive indication regarding one or more content items to be added to the playlist. Displayed may be a UI button or link element labeled, say, "Add video content to playlist." Where the user opts to add no content items to the playlist the user might not activate the UI button or link element. Where the user opts to add content items to the playlist, the user may activate the button or link element. As one example, the activation of the button or link element may cause UI display of a UI field element by which a content item to be added to the playlist may be specified (e.g., via Uniform Resource Locator (URL)). Where the user desires to add multiple content items to the playlist, the user may, with respect to each content item that is to be added, activate the UI button or link and then specify the content item via the resultant UI field element. As another example, the activation of the button or link element may cause UI display of a field element wherein the user may enter one or more search terms and/or search terms coupled with Boolean operators. The UI may display along with the field element a button or link UI element labeled, say, "search." The activation of the button or link element may cause the processing logic to search content item data 290 for content items whose associated metadata matches the search entry, and/or may cause the processing logic to request that such search be performed on its behalf (e.g., the processing logic may employ interprocess communication in requesting that one or more components and/or modules perform the search on its behalf). Such associated metadata might, for instance, include title, description, user comments, and/or closed captioning (e.g., closed captioning placed via processing logic performing speech recognition with respect to content item audio). Where no content items match the search entry, the UI may indicate such to the user. Where one or more content items do match the search entry, the UI may present these items to the user and allow the user specify that one or more of the matching content items be added to the playlist (e.g., the UI may present a checkbox UI element in connection with each matching content item, and a UI button or link element—labeled, say, "add selected items to playlist"—the activation of which indicates that the checked content items are to be added to the playlist.

At block 307 the processing logic may inform the user of one or more available collaborative guidance controls and receive specification regarding one or more selected collaborative guidance controls. Where, for instance, an available collaborative guidance control is that content item suggestions for addition to the playlist be selected from a specified group of content items, displayed may be UI button or link element labeled, say, "Specify suggestible content." Where the user opts to not restrict content item suggestions to ones selected from a specified group of content items, the user might not activate the UI element. Where the user opts to restrict content item suggestions to ones selected from a specified group of content items, the user may activate the UI element. Activation of the UI button or link element may cause the performance of one or more operations in line with that discussed hereinabove with respect to addition of content items to the playlist (e.g., content item specification such as specification via URL, and/or employ of search).

With further regard to block 307, where, for instance, an available collaborative guidance control is that only one or more particular, specified users be permitted to make content item suggestions and/or that only users belonging to one or more specified user groups (e.g., a user circle such as, for instance, a "top fans" circle) be permitted to make content item suggestions, displayed may be a UI button or link labeled, say, "Specify users who may suggest." Where the user opts to not so restrict content item suggestions (e.g., where the user desires that all users be permitted to make content item suggestions), the user might not activate the UI element. Where the user opts to so restrict content item suggestions, the user may activate the UI element. Activation of the UI button or link element may cause UI display of a field element wherein the user may enter one or more user names and/or user group names. The UI may display along with the field element a button or link UI element labeled, say, "add." The field element may, for instance, be an autocompleting field element (e.g., an autocompleting field element which displays selectable icons corresponding to user names and/or to user group names drawn from user data 291). The field element may, for instance, not be an autocompleting field element.

As noted a user, not desiring to place restrictions as to those users who may make content item suggestions, might not activate the noted UI element. Alternately or additionally, there may be a UI button or link—labeled, say, "Let all users suggest" or "Allow suggestions from the public"—which may be activatable where the user opts to not place restrictions as to who may make content item suggestions. Moreover, as an example, there may be a UI checkbox element (e.g., labeled "Allow others to suggest content for this playlist") and displayed along with that checkbox element may be the discussed field element wherein entered may be one or more user names and/or user group names.

With still further regard to block 307, where, for instance, an available collaborative guidance control is that content item suggestions for addition to the playlist be limited to content items supplied (e.g., uploaded) by one or more specified users, displayed may be a UI button or link labeled, say, "Specify acceptable source users." Where the user opts to not restrict content item suggestions to ones supplied by one or more specified users, the user might not activate the UI element. Where the user opts to restrict content item suggestions to ones supplied by one or more specified users, the user may activate the UI element. Activation of the UI button or link element may cause UI display of a field element (e.g., of the sort discussed above) wherein the user may enter one or more user names.

With additional regard to block 307, where, for instance, an available collaborative guidance control is that a user be limited to suggesting content items which he, himself has supplied (e.g., uploaded), displayed may be a UI checkbox labeled, say, "limit users to suggesting own uploads." Where the user opts to not so limit content item suggestions, the user might not activate the UI element. Where the user opts to so limit content item suggestions the user may activate the UI element.

With further regard to block 307, where, for instance, an available collaborative guidance control is that content item suggestions for addition to the playlist regard a specified topic, displayed may be a UI button or link labeled, say, "Specify acceptable topics." Where the user opts to not so restrict content item suggestions, the user might not activate the UI element. Where the user opts to so restrict content item suggestions, the user may activate the UI element. Activation of the UI element may cause the UI to display a UI field element wherein the user may enter one or more topics.

With still further regard to block 307, as a further example an available collaborative guidance control may be that content item suggestions for addition to the playlist possess one or more audio properties (e.g., that suggested content items employ a specified song) and/or video properties (e.g., that suggested content items feature a specified user). Where such is an available collaborative guidance control, displayed may be a UI button or link labeled, say, "Specify audio and/or video properties." Where the user opts to not so restrict content item suggestions to ones supplied by one or more specified users, the user might not activate the UI element. Where the user opts to so restrict content item suggestions the user may activate the UI element. Activation of the UI element may cause the UI to display a UI field element wherein the user may enter one or more audio properties and/or audio properties.

With additional regard to block 307, where, for instance, an available collaborative guidance control is that content item suggestions for addition to the playlist be limited to content items possessing a specified length property (e.g., being of a specified length, of less than a specified length, and/or of less than or equal to a specified length), displayed may be a UI button or link labeled, say, "Specify length restriction." Where the user opts to not so restrict content item suggestions, the user might not activate the UI element. Where the user opts to so restrict content item suggestions, the user may activate the UI element. Activation of the UI button or link element may cause UI display of a UI field wherein the user may specify such a length restriction. As one example the user might specify that content item suggestions for addition to the playlist be thirty seconds in length. As another example, the user might specify that content item suggestions for addition to the playlist be less than or equal to five minutes in length.

At block 309 the processing logic may receive indication regarding the manner in which content item suggestions for addition to the playlist should be handled. Options for handling content item suggestions which meet the collaborative guidance controls which have been selected for the playlist may include that such suggested content items be automatically added to the playlist by the processing logic, and that an author of the playlist indicate whether or not such suggested content items be added to the playlist. For instance, such an author might receive a UI dialog box query which indicates that a content item suggestion for addition to the playlist has been received, indicates that the suggestion meets the selected collaborative guidance controls, and asks whether or not the content item should be added to the playlist. Moreover, where a user makes a content item suggestion under circumstances where the suggestion will undergo author review, the suggesting user may receive UI indication of such after making his suggestion. For instance, the user may receive a UI indication stating "Content suggestion received. An author of the playlist will review your suggestion."

Options for handling content item suggestions which do not meet the collaborative guidance controls which have been selected the playlist may include that such suggested content items be automatically disapproved by the processing logic for addition to the playlist, and that an author of the playlist indicate whether or not such suggested content items be added to the playlist. For instance, such an author might receive a UI dialog box query which indicates that a content item suggestion for addition to the playlist has been received, indicates that the suggestion does not meet the selected collaborative guidance controls, and asks whether or not the content item should be added to the playlist.

In order to ascertain the desired option for handling content item suggestions which meet the selected collaborative guidance controls, and the desired option for handling content item suggestions which do not meet the selected collaborative guidance controls, at block 309 the processing logic may proceed as follows. The processing logic may, in one aspect, present to the user a UI indication stating, say, "Suggestions which meet collaborative guidance controls:," a radio button or link UI element labeled, say, "automatically add to playlist," and a radio button or link UI element labeled, say, "ask." The processing logic may, in another aspect, present to the user a UI indication stating, say, "Suggestions which do not meet collaborative guidance controls:," a radio button or link UI element labeled, say, "automatically disapprove," and a radio button or link UI element labeled, say, "ask." By way of the radio button or link selections, the processing logic may determine the user's desired option for handling content item suggestions which meet the selected collaborative guidance controls, and the user's desired option for handling content item suggestions which do not meet the selected collaborative guidance controls. As another example of ascertaining the desired options for handling content item suggestions, as UI checkbox element—labeled, say, "Automatically approve new video suggestions" may be provided.

At block 311 the processing logic may receive indication regarding additional playlist authors. As noted hereinabove the user who has requested creation of the playlist may be considered to be an author of the playlist. At block 311 the processing logic may learn from the user whether or not there are to be further authors for the playlist. The processing logic may present to the user a UI button or link element labeled, say, "Add further authors." Where the user desires that the user be the only author for the playlist, the user may not activate the button or link. Where the user desires that there be playlist authors further to himself or herself, the user may activate the button or link.

Activation of the button or link may cause UI display of a field element (e.g., of the sort discussed above) wherein the user may enter one or more user names of users which are to be additional playlist authors.

At block 313 the processing logic may set within playlist data 293 a data structure in which associated with one another are a playlist title in the case where such has been specified, a playlist description in the case where such has been specified, playlist content item indications in the case where the user has specified content items to be added to the playlist, indication of selected collaborative guidance controls, indication content item suggestion handling, and indication regarding additional playlist authors in the case where additional authors have been specified. As an example, the content items may be indicated within the data structure in terms of corresponding content item identifiers (e.g., Universally Unique Identifiers (UUIDs).

As an example, some or all of that which is discussed, in connection with FIG. 3, as being specifyable via UI (e.g., which collaborative guidance controls are to apply to the playlist, which users may make content item suggestions, and/or indication regarding content item suggestion handling) may be provided within the context of a UI tab element (e.g., a UI tab element labeled "Collaboration").

Figure 4:
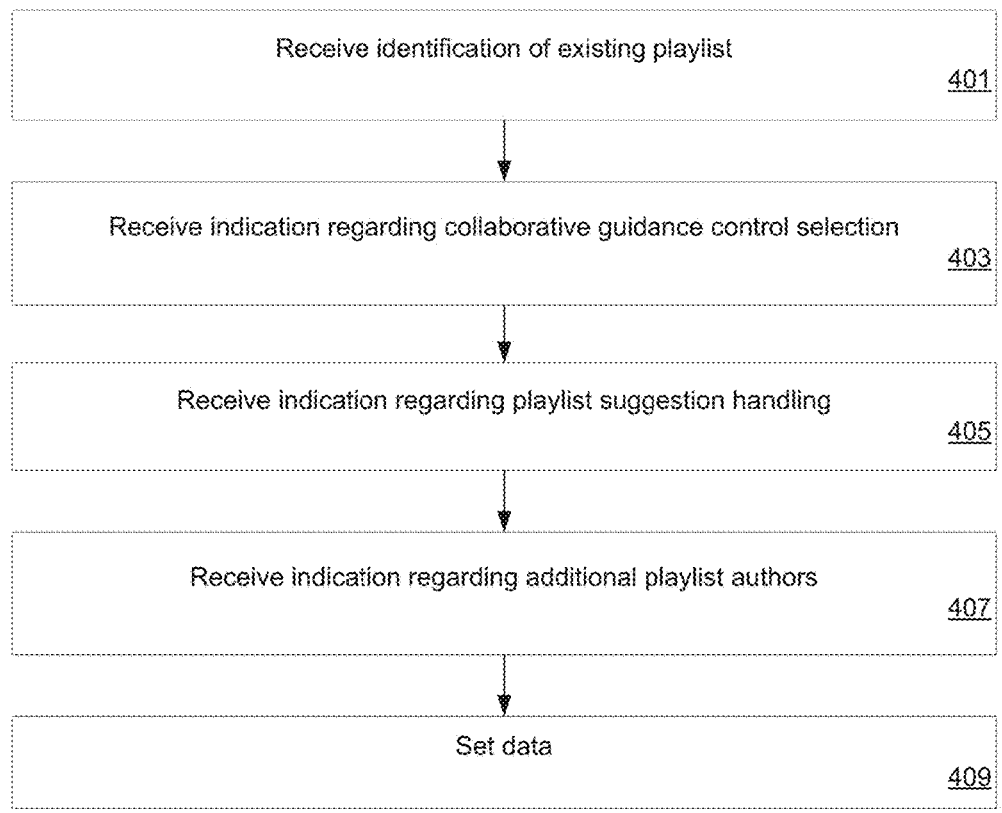
FIG. 4 is a flow diagram illustrating a method of receiving management selections regarding an existing playlist, according to an example.

FIG. 4 illustrates a flow diagram of one example of a method of receiving management selections regarding an existing playlist. The method may be performed by processing logic that comprises hardware (e.g., circuitry, dedicated logic, programmable logic, microcode, etc.), software (e.g., instructions run on a processing device to perform hardware simulation or instructions run on a processing device without the performance of hardware simulation), or a combination thereof. As one example, the method may be performed by a playlist component running on a computing device (e.g., playlist component 140 running on server 130). UI functionality discussed hereinbelow in connection with FIG. 4 may regard a UI generated by playlist UI generation module 230 and displayed by content viewer 111 running on one of client devices 110A-110Z.

Referring to FIG. 4, at block 401 processing logic may receive an identification of an existing playlist. The identification may correspond to a user navigating to an existing playlist (e.g., to an initial page or landing page for the playlist) for which the user is an author and activating a UI button or link labeled, say, "collaborative guidance settings."

At block 403 the processing logic may, for the identified existing playlist, inform the user of one or more available collaborative guidance controls and receive specification regarding one or more selected collaborative guidance controls. Such may be performed in a manner in line with that which is discussed hereinabove in connection with block 307. At block 405 the processing logic may receive indication regarding the manner in which content item suggestions for addition to the playlist be handled. Such may be performed in a manner in line with that which is discussed hereinabove in connection with block 309.

At block 407 the processing logic may receive indication regarding additional playlist authors. As noted, the user who identifies the existing playlist is an author of the playlist. At block 407 the processing logic may learn from the user whether or not there are to be further authors for the playlist. Such may be performed in a manner in line with that which is discussed hereinabove in connection with block 311.

At block 409 the processing logic may alter a data structure, stored within playlist data 293, which corresponds to the existing playlist. The processing logic may alter the data structure such that the data structure associates, with the playlist, indication of selected collaborative guidance controls, indication regarding content item suggestion handling, and indication regarding additional playlist authors in the case where additional authors have been specified. Block 409 may be performed in a manner in line with that which is discussed hereinabove in connection with block 313.

As an example, some or all of that which is discussed, in connection with FIG. 4, as being specifyable via UI (e.g., which collaborative guidance controls are to apply to the playlist, which users may make content item suggestions, and/or indication regarding content item suggestion handling) may be provided within the context of a UI tab element (e.g., a UI tab element labeled "Collaboration").

Figure 5:
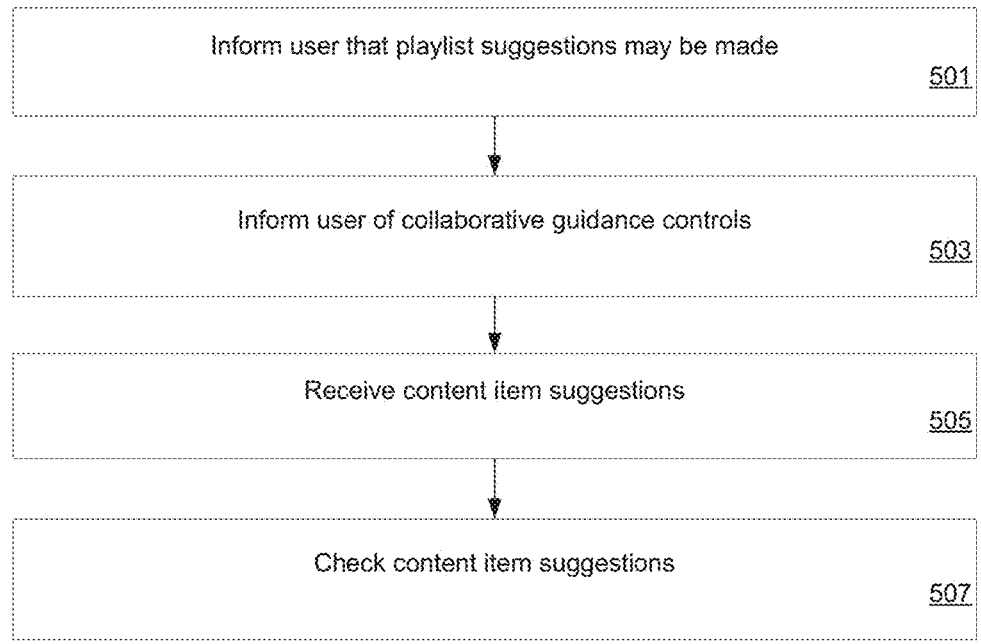
FIG. 5 is a flow diagram illustrating a method of receiving content item suggestions for addition to a playlist, according to an example.

FIG. 5 illustrates a flow diagram of one example of a method of receiving content item suggestions for addition to a playlist. The method may be performed by processing logic that comprises hardware (e.g., circuitry, dedicated logic, programmable logic, microcode, etc.), software (e.g., instructions run on a processing device to perform hardware simulation or instructions run on a processing device without the performance of hardware simulation), or a combination thereof. As one example, the method may be performed by a playlist component running on a computing device (e.g., playlist component 140 running on server 130). UI functionality discussed hereinbelow in connection with FIG. 5 may regard a UI generated by playlist UI generation module 230 and displayed by content viewer 111 running on one of client devices 110A-110Z.

Referring to FIG. 5, at block 501 a user navigating to a playlist may receive UI indication that the user may suggest content items for addition to the playlist. Such may occur with the user navigating to the playlist (e.g., to an initial page or landing page for the playlist). Where a collaborative guidance control for the playlist is that only specified users and/or users belonging to one or more specified user groups be permitted to make content item suggestions, the user may receive such indication in the case where the user meets such criteria.

At block 503 the processing logic may inform the user of the collaborative guidance controls which apply to the playlist. As an example, displayed may be a UI button or link labeled, say, "show playlist suggestion rules." Activation of the UI button or link element may cause UI display of indication regarding the collaborative guidance controls which apply to the playlist. Where, for instance, a collaborative guidance control which applies to the playlist is that content item suggestions for addition to the playlist be selected from a specified group of content items, activation of the UI button or link element may cause UI display of a listing of those content items. Where, for instance, a collaborative guidance control which applies to the playlist is that content item suggestions for addition to the playlist regard a specified topic, activation of the UI button or link element may cause UI display of the topic. Where, for instance, a collaborative guidance control which applies to the playlist is that content item suggestions for addition to the playlist possess one or more audio properties and/or video properties (e.g., that suggested content items employ a specified song), activation of the UI button or link element may cause UI display of those one or more audio and/or video properties (e.g., UI display of the song which is to be employed or UI display of the user who is to be featured).

At block 505 the processing logic may receive user indication of one or more content item suggestions. The processing logic may display a UI button or link element labeled, say, "Make suggestion." Where the user opts to not make any suggestions of content items to be added to the playlist, the user might not activate the UI button or link element. Where the user opts to make suggestions of content items to be added to the playlist the user may activate the button or link element.

As one example, the activation of the button or link element may cause UI display of a UI field element by which content item suggestion be specified (e.g., via URL). As another example, the activation of the button or link element may cause UI display of a field element wherein the user may enter one or more search terms and/or search terms coupled with Boolean operators. Where no content items match the search entry, the UI may indicate such to the user. Where one or more content items do match the search entry, the UI may present these items to the user and allow the user specify that one or more of the matching content items should be set forth as content item suggestions. According to an example, such search may exclude from search results content items which do not meet the collaborative guidance controls which have been selected for the playlist. According to another example such search results might not be excluded. Such field-based suggestion functionality and such search-based suggestion functionality may be performed in a manner in line with that which is discussed hereinabove in connection with block 305.

At block 507 the processing logic may check whether the content item suggestions meet the collaborative guidance controls which have been selected for the playlist. Having performed the check, the processing logic may act in accordance the set suggestion handling option. Where a suggested content item meets the at-hand guidance controls the processing logic may, in accordance with the set option, automatically add (e.g., in line with that which has been discussed hereinabove) the content item to the playlist or pose a UI query to an author of the playlist as to whether or not the content item should be added to the playlist. For instance, the UI query might set forth "The following seven content items which meet your specifications have been suggested. Please tick the checkbox(es) of those—if any—which should be added to the playlist. When done, click 'ok'." Where such author indicates that a given content item is to be added to the playlist, the processing logic may add (e.g., in line with that which has been discussed hereinabove) the content item to the playlist. As examples, the author may be presented the UI query when navigating to the playlist (e.g., to an initial page or landing page for the playlist) and/or when logging in. The user, as an example, may be provided with a UI button or link which allows for indication that all indicated suggestions should be accepted and/or a UI button or link which allows for indication that all indicated suggestions should be rejected.

Where a suggested content item does not meet the at-hand guidance controls the processing logic may, in accordance with the set option, automatically disapprove the content item or pose a UI query to an author of the playlist as to whether or not the content item should be added to the playlist. For instance, the UI query might set forth "The following two content items been suggested. They do NOT meet your specifications. Should you nevertheless desire that one or more of the be added to the playlist, please tick the corresponding one or more checkbox(es). When done, click 'ok'." Where such author indicates that a given content item is to be added to the playlist, the processing logic may add (e.g., in line with that which has been discussed hereinabove) the content item to the playlist. As examples, the author may be presented the UI query when navigating to the playlist (e.g., to an initial page or landing page for the playlist) and/or when logging in. The user, as an example, may be provided with a UI button or link which allows for indication that all indicated suggestions should be accepted and/or a UI button or link which allows for indication that all indicated suggestions should be rejected.

In so checking, where a collaborative guidance control which applies to the playlist is that content item suggestions for addition to the playlist be selected from a specified group of content items, the processing logic may determine whether or not the suggested content items are among those specified content items.

With respect to collaborative guidance controls applied to the playlist other than suggestions being limited to a specified group of content items, the checking may involve the processing logic considering the metadata of the suggested content items in light of those collaborative guidance controls. For example, where a collaborative guidance control which applies to the playlist is that content item suggestions be limited to content items supplied by one or more specified users, or that a user be limited to suggesting content items which he, himself has supplied, the checking may involve the processing logic considering supplying user (e.g., uploading user) metadata of the suggested content items in light of—depending on the at-hand control—the specified one or more users or the identity of the user who has made the suggestion (e.g., as indicated by login of that user).

As another example, where a collaborative guidance control which applies to the playlist is that content item suggestions for addition to the playlist regard a specified topic, the checking may involve the processing logic considering topic metadata of the suggested content items in light of the specified topic. As a further example, where a collaborative guidance control which applies to the playlist is that content item suggestions for addition to the playlist possess one or more audio properties and/or video properties, the checking may involve the processing logic considering—as appropriate—audio and/or video property metadata of the suggested content items in light of the specified one or more audio properties and/or video properties. For instance, where a collaborative guidance control which applies to the playlist is that content item suggestions for addition to the playlist employ a specified song, the checking may involve the processing considering employed song metadata in light of the specified song. For instance, where a collaborative guidance control which applies to the playlist is that content item suggestions for addition to the playlist feature a specified user, the checking may involve the processing considering featured user metadata in light of specified user.

As an additional example, where a collaborative guidance control which applies to the playlist is that content item suggestions for addition to the playlist possessing a specified length property (e.g., being of a specified length, of less than a specified length, and/or of less than or equal to a specified length), the checking may involve the processing logic considering length metadata of the suggested content items in light of the specified length property. Where search is employed in connection with the user making content item suggestions, excluded from search results may be content items which do not meet the collaborative guidance controls which have been selected for the playlist. Where such holds, the check discussed in connection with block 507 might not be performed.

According to an example, an option available to an author of a playlist may be whether or not multiple content item instances are permitted. For instance, via the employ of one or more UI elements such an author may be able to specify, with respect to an indicated playlist (e.g., indicated via a UI pulldown element or a UI field element), whether or not multiple content instances are allowable for that playlist. Processing logic (e.g., processing logic of playlist component 140) may, in accordance with that which is discussed hereinabove, set within a corresponding playlist data structure indication of the election. Where a playlist author so indicates that multiple content item instances are disallowed for a given playlist, processing logic may act to examine (e.g., periodically) fingerprint metadata (e.g., fingerprint metadata formulated via hashing) of content items in that playlist in order to determine whether or not given content items appear in the playlist more than once. Where multiple content item instances are found, content items may be deleted from the playlist such that the playlist possesses only single instances of content items. In so determining whether or not content items appear more than once, as an example content item cropping (e.g., temporal cropping) may be taken into account. For instance, in considering a playlist for multiple instances of, say, video content item entries, fingerprint metadata consideration and/or timestamp metadata consideration may find that a first entry in the playlist and a second entry in the playlist correspond to a common source video (e.g., a common short subject film), but are temporally cropped differently (e.g., the source short subject film may be four minutes in length, the first playlist entry may run from timestamp 0:00 of that source video to timestamp 0:32 of that source video, and the second playlist entry may run from timestamp 0:03 to timestamp 0:33 of that source video). One or more cropping overlap thresholds may, according to an example, be settable by a playlist author regarding how much cropping overlap is to exist between a first playlist entry drawn from a given source content item and a second playlist entry drawn from that source content item in order for the two playlist entries to be considered duplicates of one another. For instance, a given two such playlist entries may be considered to be duplicates of one another in the case where they overlap (e.g., temporally) for an author-specified percentage (e.g., for ten percent of the total time length of the source) and/or for an author-specified number of units (e.g., for three seconds).

According to another example, an option available to an author of a playlist may be the sort order of content items within the playlist. Possibilities for sort order may include the number of times which a content item has been provided (e.g., uploaded), the number of times which a content item has been the subject of user recommendation, the chronology in terms of content item provision (e.g., upload time), the chronology in terms of content item recommendation receipt date, popularity, and/or author-specified sort order (e.g., with an author specifying, by his own volition, sort ordinality for playlist content items). Such popularity may regard total number of consumptions (e.g., views), number of consumptions (e.g., views) with respect to one or more given content groupings (e.g., channels), quantity of likes, and/or quantity of votes. Such an author may be able to indicate desired sort directionality (e.g., most recently recommended items at the top of the playlist versus most recently recommended items at the bottom of the playlist). Via, for instance, the employ of one or more UI elements, such an author may be able to specify, with respect to an indicated playlist (e.g., indicated via a UI pulldown element or a UI field element), desired sort order. Processing logic may set within a corresponding playlist data structure indication of the election. The processing logic may set playlist sort order metadata to reflect appropriate sort order.

According to a further example, an option available to an author of a playlist may concern feed placement with regard to content items which are added to a playlist via content item suggestion. A feed may be a UI listing of content items which sets forth those content items as being the product of, say, a given one or more users and/or channels. Possibilities for feed placement may include placement in the feed of the user who has suggested the at-hand content item, placement in the feed of users whose content item suggestions have led to additions to the playlist other than the at-hand content item, placement in the feed of the authors of the playlist, and/or placement in a feed corresponding to the playlist itself rather than to a user. One or more such placement possibilities might be serve as defaults (e.g., defaults set in connection with a system configuration operation). For instance, the default feed placement may be placement in the feed of the user who has suggested the at-hand content item and placement in the feed of users whose content item suggestions have led to additions to the playlist other than the at-hand content item. Via, for instance, the employ of one or more UI elements an author may be able to specify, with respect to an indicated playlist (e.g., indicated via a UI pulldown element or a UI field element), one or more desired feed placements. Processing logic may set within a corresponding playlist data structure indication of the election. The processing logic may set one or more feeds to reflect the elected one or more feed placements.

A playlist may include one or more content items which have been added to the playlist by virtue of user suggestion. As an example, the playlist may provide for such a content item UI indication of the one or more users who suggested that content item. For instance, where the playlist included a content item entitled "Death Valley at Sunset" which had been added to the playlist due to a suggestion by an user having the user name "Johnny_Z," UI for the playlist may include the text "Death Valley at Sunset—selected by Johnny_Z." Whether or not a given such playlist includes such content item suggestion attributions may be settable by the one or more authors of the playlist via one or more UI elements (e.g., UI radio button elements).

The one or more authors of a playlist may, as an example, be able to indicate via one or more UI elements the quantity of suggestions which individual users may make. For instance, an author of the playlist may specify that only one suggestion may be made per user, or that individual users may make multiple suggestions for the playlist but that once one of a user's suggestions has led to a playlist addition no further suggestions will be accepted from that user. So limiting user suggestions—say to one suggestion per user—might, as an example, be employed where a playlist is being employed in support of a contest.

Content item suggestions in the vein of those made by users may, as an example, be made by processing logic. The processing logic may consider a title of the playlist, a description of the playlist, collaborative guidance controls which have been set for the playlist, consumption (e.g., viewing) histories of one or more users associated with the playlist (e.g., playlist authors, users who have made content item suggestions in connection with the playlist, and/or viewers of the playlist), and/or metadata of content items included in the playlist in light of metadata of available content items of the content sharing platform (e.g., as stored amongst content item data 290) so as to formulate one or more suggestions of content items which, say, meet the collaborative guidance controls which have been set for the playlist and are in keeping with one or more of the title, the description, the user consumption histories, and/or the metadata of those content items which are presently included in the playlist.

Processing logic-provided content item suggestions may be handled in a manner in-line with the handling of user-provided content item suggestions. In accordance with set content item suggestion handling options, one or more of the processing logic-suggested content items may be automatically added to the playlist by processing logic and/or one or more authors of the playlist may receive UI query regarding whether or not to accept given ones of the content items which have been suggested by the processing logic. As one example, processing logic-provided content item suggestions may be presented to playlist authors in a manner which casts the suggestions as having been made by a robot, computer, or machine having a cartoon-like avatar and/or user (e.g., login-type) image. The one or more authors of a playlist may, as an example, be able to indicate via one or more UI elements whether or not processing logic is permitted to make content item suggestions for that playlist.

As an example, associated with a content item (e.g., a video) may be one or more playlists which are cast as response playlists. Users may employ such response playlists to suggest addition of content items (e.g., videos) which serve to reply to the content item to which the playlist is directed. For instance, suppose a response playlist directed to a video entitled "Yosemite in the Springtime." One user might suggest for addition to the response playlist a video entitled "Joshua Tree in the Springtime" while another user might suggest for addition to the response playlist a video entitled "Yosemite: Autumn Sunrise."

It is noted that at certain junctures herein content items are, to facilitate discussion, discussed in terms of video content. Still the functionality discussed herein is applicable to a wide swath of content items including but not limited to textual content items (e.g., books, magazines, webpages, text messages, emails, and/or text snippets), still image media items (e.g., photographs, paintings, and/or drawings), and/or audio-centric content items (e.g., music).

Content item data 290 may contain, for content items of the content sharing platform, corresponding metadata applicable, for instance, in ascertaining whether or not given ones of those content items meet set collaborative guidance controls. As examples, such metadata may include metadata indicating the one or more users who have provided (e.g., uploaded) content items, the topics of content items, the audio properties of content items (e.g., employed songs), the video properties of content items (e.g., featured users), and/or lengths of content items (e.g., specified with regard to hours, minutes, and/or seconds).

As such, ascertaining whether or not a given content item meets a set collaborative guidance control may involve consideration of appropriate, corresponding metadata. Ascertaining whether or not a content item meets a set collaborative guidance control which calls for provision (e.g., upload) by one or more specified users may involve consideration of providing user metadata for that content item. Ascertaining whether or not a content item meets a set collaborative guidance control which calls for the content item concerning a specified topic may involve consideration of topic metadata for that content item. Ascertaining whether or not a content item meets a set collaborative guidance control which calls for the employ of a specified audio property (e.g., the employ of a specified song) may involve consideration of audio property metadata (e.g., employed song metadata) for that content item. Ascertaining whether or not a content item meets a set collaborative guidance control which calls for the presence of a specified video property (e.g., the featuring of a specified user) may involve consideration of video property metadata (e.g., featured user metadata) for that content item. Ascertaining whether or not a content item meets a set collaborative guidance control which calls for a specified content item length may involve consideration of length metadata for that content item.

Formulation of providing user metadata may involve processing logic (e.g., processing logic of the content sharing platform) acting with receipt of a content item from a user to record as metadata the identity of that user (e.g., as a corresponding user name employed by the content sharing platform). Formulation of topic metadata may involve processing logic (e.g., processing logic of the content sharing platform) performing topical analysis of user tags of a content item, of user comments posted in response to a content item, and/or of closed captioning of a content item (e.g., captioning formulated via speech recognition). The topical analysis may involve looking for one or more words, word synonyms, words patterns, and/or word synonym patterns which occur with a certain threshold frequency (e.g., set during a configuration operation). For instance, user tags, user comments, and/or a closed captioning track for a content item including "car" and "automobile" occurring with a certain frequency might be taken as indicating that the content item regards automobiles. Formulation of topic metadata may alternately or additionally involve processing logic (e.g., processing logic of the content sharing platform) considering consumption histories (e.g., viewing histories) of users who have consumed (e.g., viewed) the content item. For instance, a content item having been consumed by users whose consumption histories indicate that they primarily consume content items regarding newly-released first-person-shooter console video games might be taken as suggestive that the content item concerns a newly-released first-person-shooter video game.

Formulation of audio property metadata (e.g., employed song metadata) and/or video property metadata may involve processing logic (e.g., processing logic of the content sharing platform) fingerprinting (e.g., hashing) an at-hand content item and comparing the result to a fingerprint (e.g., hash) of a reference content item known to possess a certain audio property (e.g., known to employ a certain song) and/or video property. In the case where the comparison for the at-hand content item yields a match with respect to a given reference content item, the at-hand content item might be considered to possess the audio property and/or video property of the reference content item (e.g., the at-hand content item might be considered to employ the song employed by the reference content item). The fingerprint (e.g., hash) for the reference content item may formulated by processing logic of the content sharing platform and/or received by the content sharing platform from outside the content sharing platform (e.g., a record label, movie studio, and/or television studio might provide such reference content item hashes to the content sharing platform).

As an example, visual information (e.g., frames) of an at-hand content item might be compared (e.g., via facial recognition) by processing logic (e.g., processing logic of the content sharing platform) to visual information (e.g., one or more login-type images) known to depict a given user. In the case where the comparison yields a match, the at-hand content item might be considered to feature that user. A certain threshold portion (e.g., set during a configuration operation) of the at-hand content item might be called for to include the user in order for the content item to be deemed one that features the specified user. For instance, a certain percentage of frames and/or a certain percentage of the time duration of the content item might be called for to include the user in order for the content item to be deemed one that features the specified user.

Formulation of length metadata may involve processing logic (e.g., processing logic of the content sharing platform) ascertaining the temporal difference between a timestamp at the end of a given content item and a timestamp at the beginning of a given content item. Moreover, formulation of metadata discussed herein may involve machine learning. For instance, machine learning processing logic (e.g., processing logic of the content sharing platform) may be trained by being presented with one or more reference content items known to possess one or more certain properties (e.g., concern a certain topic, employ a certain song, and/or feature a certain user). Thereafter the processing logic, being presented with a suggested content item, may indicate whether or not the suggested content item possesses the properties for which training occurred (e.g., where training is with respect to employing a certain song, the processing logic may indicate whether or not the suggested content item employs the song).

As one example, such metadata might be formulated by processing logic (e.g., processing logic of the content sharing platform) prior to ascertaining whether or not content items meet set collaborative guidance controls. As another example, such metadata might be formulated by processing logic (e.g., processing logic of the content sharing platform) in response to an at-hand call to ascertain whether or not at-hand content items meet set collaborative guidance controls. Such responsive metadata formulation might transpire in the case where one or more security restrictions deny access to a given one or more content items in absence of a grant of permission by a user to access those content items (e.g., a user suggesting a certain content item for playlist inclusion may include the user granting processing logic access to the content item in order to ascertain whether or not it meets set playlist collaborative guidance controls).

FIGS. 6A-6C illustrate example UIs regarding collaborative guidance control functionality. FIG. 6A sets forth UI elements 601-613 employable by an author of a playlist in choosing collaboration settings for that playlist. Shown in FIG. 6A are checkbox UI element 601 and autocompleting UI field element 603 being presented in the context of selected UI tab element 605, which is labeled "Collaboration." Checkbox UI element 601, labeled "Allow others to suggest content for this playlist," has been ticked. Entered into autocompleting UI field element 603 has been "JSm," which represents the author having partially entered the user name "JSmith" as a user who may suggest content for the playlist. Displayed in connection with autocompleting UI field element 603 are three user names—"JSmart" 607, "JSmiley" 609, and "JSmith" 611—which, according to user data 291, match the entered "JSm." "JSmith" 611 has been selected. Also shown in FIG. 6A is UI checkbox element 613 labeled "Automatically add suggested content items which met set criteria." Ticking of this checkbox allows the author to specify that content item suggestions which meet the collaborative guidance controls which have been selected for the playlist should be automatically added to the playlist. Processing logic (e.g., processing logic of playlist component 140) may act in accordance with that which is discussed hereinabove with respect to block 313 to set within playlist data 293 specification of that which is indicated via UI elements 601-613.

Shown in FIG. 6B UI are elements 615-627 employable by a user in suggesting content items for inclusion in a playlist. That which is depicted in FIG. 6B is presented to a user who has navigated to a landing page of a playlist and, having been determined by processing logic to have met a collaborative guidance control for the playlist specifying that only specified users are permitted to make content item suggestions for the playlist, has received UI indication that he or she may suggest content items for addition to the playlist. The user to whom that which is depicted in FIG. 6B is presented has further received UI indication of the collaborative guidance controls which apply to the playlist and has activated a UI element so as to indicate his desire to make content item suggestions.

With further regard to FIG. 6B, the user has entered into UI field element 615 the search query "Death Valley" and has activated UI button element 617 labeled "Search." The user has been presented UI indications 619-623 of content items which both match the "Death Valley" search query and which also meet the collaborative guidance controls which have been selected for the playlist. UI indications 619-623 include UI checkbox elements which, if ticked along with activation of UI button element 625 labeled "Suggest selected items," allow for user specification of suggestions for the playlist. In FIG. 6B the user has ticked the box for the content item entitled "Death Valley Sailing Stones" and has activated UI button element 625. In response to this activation the user has been presented with UI notification element 627 which provides to the user the message "Content item received. An author of the playlist will review your suggestion."

FIG. 6C sets forth UI elements employable by an author of a playlist in reviewing content item suggestions. That which is depicted in FIG. 6C is presented to a playlist author who has navigated to a landing page of a playlist, received UI indication that suggestions for the playlist, which meet the collaborative guidance controls set for the playlist, have been received, and has activated a UI element so as to convey a desire to review the suggestions.

With further regard to FIG. 6C, UI notification element 629 states "The following four content items which meet your specification have been suggested. Please tick the boxes of those—if any—which should be added to the playlist. When done, click 'OK.' Or, if appropriate, click 'Add all' or 'Reject all.'" Further depicted in FIG. 6C are UI indications 631-635 which display the titles of the corresponding suggested content items and set forth checkboxes which may be ticked as noted, and UI button element 637 which is labeled "OK." In FIG. 6C the author has ticked the checkboxes for the content items entitled "Death Valley Sailing Stones" and "Joshua Tree Visitor Center," and may proceed to click UI element 637. Also shown are UI button element 639 labeled "Add all" and UI button element 641 labeled "Reject all."

Figure 7:
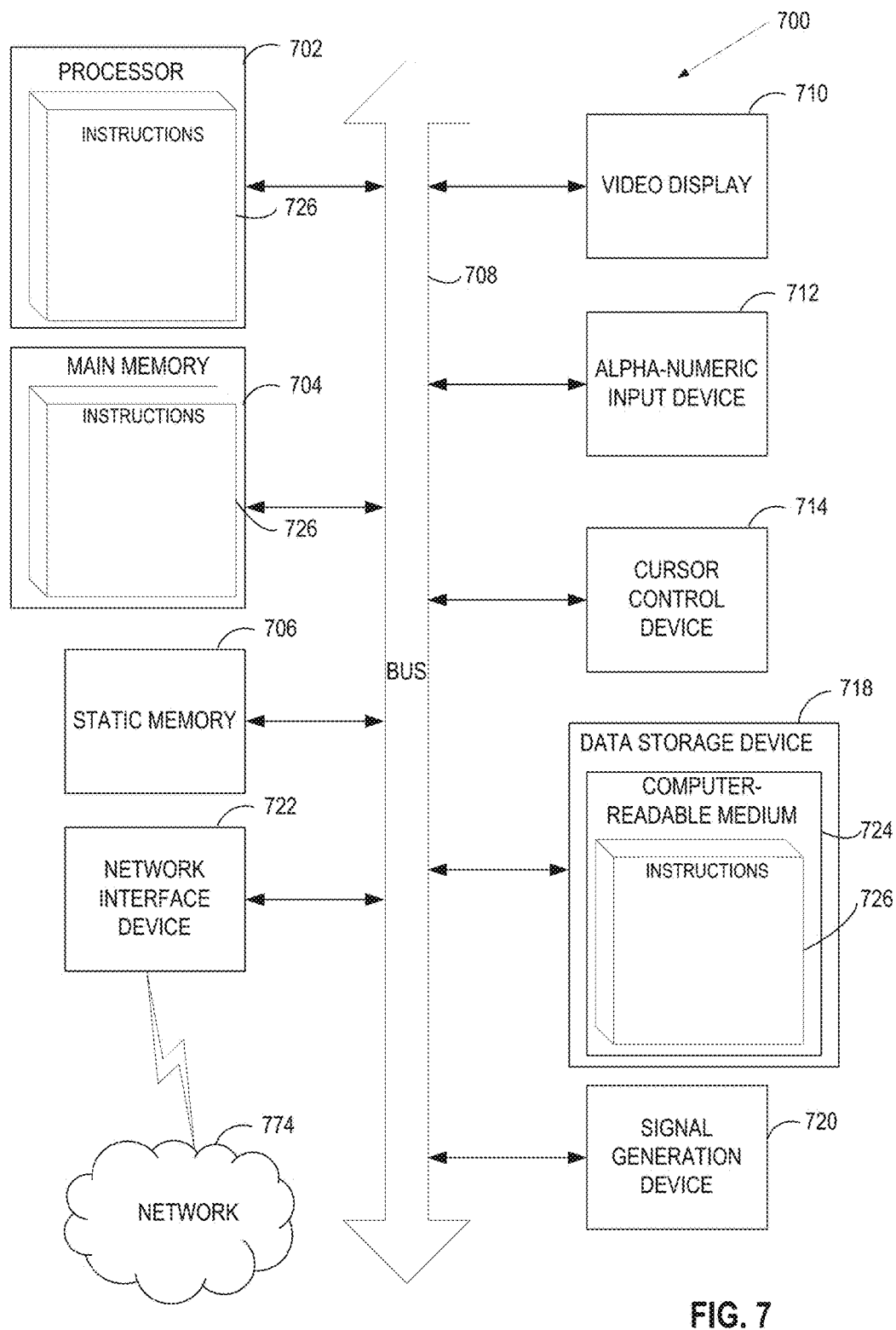
FIG. 7 is a block diagram illustrating a computer system, according to an example.

FIG. 7 illustrates a diagrammatic representation of an example of a machine in the form of a computer system 700 within which a set of instructions, for causing the machine to perform any one or more of the methodologies discussed herein, may be executed. In alternative examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD), a cathode ray tube (CRT), or a touch screen), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 via the network interface device 722.

According to an example, the instructions 726 include instructions for a playlist component 140 and/or for a generation component 190 which may correspond, respectively, to their identically-named counterparts described herein, and/or to a software library containing methods that implement that which is discussed herein in connection with playlist component 140 and/or generation component 190. While the computer-readable storage medium 724 is shown in the example of FIG. 7 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the foregoing description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference herein to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
providing, by a processing device, indication regarding a plurality of available collaborative guidance controls for a playlist created by a first user of a plurality of users of a content sharing platform, wherein the playlist comprises content items hosted by the content sharing platform, and wherein the playlist is accessible for consumption by the plurality of users via a plurality of user devices;
receiving, by the processing device, a user selection of the first user regarding one or more collaborative guidance controls of the plurality of available collaborative guidance controls for the playlist, wherein the selected one or more collaborative guidance controls are to limit a number of user suggestions from a particular user based on a number of content items previously suggested by the particular user that have been added to the playlist;
receiving, by the processing device, a user suggestion of a second user of the plurality of users regarding an additional content item hosted by the content sharing platform for addition to the playlist;
determining, by the processing device, a number of content items previously suggested by the second user that have been added to the playlist; and
responsive to determining that the number of the added content items that were previously suggested by the second user is compliant with the selected one or more collaborative guidance controls, adding the additional content item to the playlist for consumption by the plurality of users via the plurality of user devices.

2. The method of claim 1, further comprising receiving, by the processing device, first user indication regarding one or more authors for the playlist.

3. The method of claim 1, wherein the one or more available collaborative guidance controls comprise one or more of: a collaborative guidance control specifying that suggested content items be uploaded by a specified user, a collaborative guidance control specifying that suggested content items regard an indicated topic, a collaborative guidance control specifying that suggested content items employ an indicated song, or a collaborative guidance control specifying that suggested content items feature an indicated user.

4. The method of claim 1, further comprising:
prior to adding the additional content item to the playlist, checking metadata of the additional content item for compliance with the selected one or more collaborative guidance controls.

5. The method of claim 1, further comprising receiving, by the processing device, first user indication that:
suggested content items matching the selected one or more collaborative guidance controls be automatically added to the playlist; or
suggested content items matching the selected one or more collaborative guidance controls be subjected to playlist author review.

6. The method of claim 1, further comprising receiving, by the processing device, first user indication that multiple content item instances are not permitted in the playlist.

7. The method of claim 1, further comprising receiving, by the processing device, first user indication regarding feed placement of content items which are added to the playlist via content item suggestion.

8. A method, comprising:
receiving, via a user interface, a first indication that content item suggestions are permitted for a playlist hosted by the content sharing platform, the first indication being received from a user device of a first user of the plurality of users of the content sharing platform, wherein the playlist comprises content items hosted by the content sharing platform, and wherein the playlist is accessible for consumption by the plurality of users via a plurality of user devices;
receiving, via the user interface, a second indication of one or more second users of the plurality of users of the content sharing platform who are permitted to suggest content items for the playlist, the second indication being received from the user device of the first user of the plurality of users of the content sharing platform;
receiving, via the user interface, a third indication that suggested content items matching a set collaborative guidance controls be automatically added to the playlist, the suggested content items being hosted by the content sharing platform, the third indication being received from the user device of the first user of the plurality of users of the content sharing platform, wherein the set of collaborative guidance controls comprises a first collaborative guidance control that specifies a limit to a number of user suggestions from a particular user that are to be added to the playlist, and wherein the suggested content items suggested by a second user of the one or more second users are to be automatically added to the playlist upon determining that a number of content items previously suggested by the second user and added to the playlist is compliant with the first collaborative guidance control; and
setting, within playlist data, specification regarding one or more of the first indication that content item suggestions are permitted for the playlist, the second indication of the one or more users who are permitted to suggest content items for the playlist, or the third indication that suggested content items matching the set collaborative guidance controls be automatically added to the playlist.

9. The method of claim 8, further comprising:
providing, via the user interface, display of one or more suggested content items which match one or more specified collaborative guidance controls; and
providing, via the user interface, one or more user interface elements employable in accepting one or more of the suggested content items for playlist inclusion.

10. The method of claim 8, further comprising:
providing, via the user interface, a user interface element employable in setting forth a content item search query;
providing, via the user interface, indication of one or more content items of the plurality of content items maintained by the content sharing platform which meet collaborative guidance controls set for the playlist and which match the search query; and
providing, via the user interface, one or more user interface elements employable in selecting content items of the one or more content items indicated as suggestions for addition to the playlist.

11. An apparatus, comprising:
a memory; and
a processing device communicably coupled to the memory, the processing device to execute instructions to:
provide indication regarding a plurality of available collaborative guidance controls for a playlist created by a first user of a plurality of users of a content sharing platform, wherein the playlist comprises content items hosted by the content sharing platform, and wherein the playlist is accessible for consumption by the plurality of users via a plurality of user devices;
receive a user selection of the first user regarding one or more collaborative guidance controls of the plurality of available collaborative guidance controls for the playlist, wherein the selected one or more collaborative guidance controls are to limit a number of user suggestions from a particular user based on a number of content items previously suggested by the particular user that have been added to the playlist;
receive a user suggestion of a second user of the plurality of users that suggests an additional content item hosted by the content sharing platform for addition to the playlist;
determine a number of content items previously suggested by the second user that have been added to the playlist; and
responsive to determining that the number of the added content items that were previously suggested by the second user is compliant with the selected one or more collaborative guidance controls, add the additional content item to the playlist for consumption by the plurality of users via the plurality of user devices.

12. The apparatus of claim 11, wherein the processing device further executes instructions to:
receive first user indication regarding one or more authors for the playlist.

13. The apparatus of claim 11, wherein the one or more available collaborative guidance controls comprise one or more of: a collaborative guidance control specifying that suggested content items be uploaded by a specified user, a collaborative guidance control specifying that suggested content items regard an indicated topic, a collaborative guidance control specifying that suggested content items employ an indicated song, or a collaborative guidance control specifying that suggested content items feature an indicated user.

14. The apparatus of claim 11, wherein the processing device further executes instructions to:
prior to adding the additional content item to the playlist, check metadata of the additional content item for compliance with the selected one or more collaborative guidance controls.

15. The apparatus of claim 11, wherein the processing device further executes instructions to:
receive first user indication that:
suggested content items matching the selected one or more collaborative guidance controls be automatically added to the playlist; or
suggested content items matching the selected one or more collaborative guidance controls be subjected to playlist author review.

16. The apparatus of claim 11, wherein the processing device further executes instructions to:
receive first user indication that multiple content item instances are not permitted in the playlist.

17. The apparatus of claim 11, wherein the processing device further executes instructions to:
receive first user indication regarding feed placement of content items which are added to the playlist via content item suggestion.

18. A non-transitory machine-readable storage medium storing instructions which, when executed, cause a processing device to perform operations comprising:
providing, by a processing device, indication regarding a plurality of available collaborative guidance controls for a playlist created by a first user of a plurality of users of a content sharing platform, wherein the playlist comprises content items hosted by the content sharing platform, and wherein the playlist is accessible for consumption by the plurality of users via a plurality of user devices;
receiving, by the processing device, a user selection of the first user regarding one or more collaborative guidance controls of the plurality of available collaborative guidance controls for the playlist, wherein the selected one or more collaborative guidance controls are to limit a number of user suggestions from a particular user based on a number of content items previously suggested by the particular user that have been added to the playlist;
receiving, by the processing device, a user suggestion of a second user of the plurality of users regarding an additional content item hosted by the content sharing platform for addition to the playlist;
determining, by the processing device, a number of content items previously suggested by the second user that have been added to the playlist; and
responsive to determining that the number of the added content items that were previously suggested by the second user is compliant with the selected one or more collaborative guidance controls, adding the additional content item to the playlist for consumption by the plurality of users via the plurality of user devices.

19. The non-transitory machine-readable storage medium of claim 18, wherein the processing device performs operations further comprising:
receiving, by the processing device, first user indication regarding one or more authors for the playlist.

20. The non-transitory machine-readable storage medium of claim 18, wherein the one or more available collaborative guidance controls comprise one or more of: a collaborative guidance control specifying that suggested content items be uploaded by a specified user, a collaborative guidance control specifying that suggested content items regard an indicated topic, a collaborative guidance control specifying that suggested content items employ an indicated song, or a collaborative guidance control specifying that suggested content items feature an indicated user.

21. The non-transitory machine-readable storage medium of claim 18, wherein the processing device performs operations further comprising:

prior to adding the additional content item to the playlist, checking metadata of the additional content item for compliance with the selected one or more collaborative guidance controls.

22. The non-transitory machine-readable storage medium of claim 18, wherein the processing device performs operations further comprising:

receiving, by the processing device, first user indication that:

suggested content items matching the selected one or more collaborative guidance controls be automatically added to the playlist; or suggested content items matching the selected one or more collaborative guidance controls be subjected to playlist author review.

23. The non-transitory machine-readable storage medium of claim 18, wherein the processing device performs operations further comprising:

receiving, by the processing device, first user indication that multiple content item instances are not permitted in the playlist.

24. The non-transitory machine-readable storage medium of claim 18, wherein the processing device performs operations further comprising:

receiving, by the processing device, first user indication regarding feed placement of content items which are added to the playlist via content item suggestion.

25. The method of claim 1, wherein the first user is capable of granting one or more other users ability to update the selection of the one or more collaborative guidance controls of the plurality of available collaborative guidance controls for the playlist.

* * * * *